(12) United States Patent
Patelczyk

(10) Patent No.: US 6,282,791 B1  
(45) Date of Patent: Sep. 4, 2001

(54) METHOD OF MAKING AN AUTOMOTIVE VEHICLE CONVERTIBLE ROOF

(75) Inventor: Jeffrey S. Patelczyk, Woodhaven, MI (US)

(73) Assignee: ASC Incorporated, Southgate, MI (US)

(*) Notice: Subject to any disclaimer, the term of this patent is extended or adjusted under 35 U.S.C. 154(b) by 0 days.

(21) Appl. No.: 09/383,801

(22) Filed: Aug. 26, 1999

(51) Int. Cl.$^7$ .................................................. B21D 53/88
(52) U.S. Cl. .................. 29/897.2; 29/527.1; 264/261; 264/279.1; 296/118
(58) Field of Search .................. 29/897.2, 527.1; 264/250, 259, 261, 279.1; 296/118, 119

(56) References Cited

U.S. PATENT DOCUMENTS

| | | |
|---|---|---|
| 10,422 | 12/1854 | Raymond . |
| 264,203 | 9/1882 | Smith . |
| 268,436 | 12/1882 | Smith . |
| 268,437 | 12/1882 | Smith . |
| 279,016 | 6/1883 | Raymond . |
| 328,526 | 10/1885 | Sherwood . |
| 366,511 | 7/1887 | Sampsell . |
| 730,094 | 6/1903 | Cole . |
| 830,412 | 9/1906 | Cole . |
| 988,083 | 3/1911 | Ellis . |
| 1,672,181 | 6/1928 | Stokes . |
| 1,789,137 | 1/1931 | Fitch . |
| 1,947,682 | 2/1934 | Swan . |
| 2,538,931 | 1/1951 | Zummach . |
| 2,580,337 | 12/1951 | Votypka . |
| 2,708,137 | 5/1955 | Poelman . |
| 2,768,023 | 10/1956 | Landon . |
| 2,823,951 | 2/1958 | Stahl . |
| 3,692,354 | 9/1972 | Tuerk . |
| 4,261,615 | 4/1981 | Deaver . |
| 4,573,732 | 3/1986 | Muscat . |
| 4,720,133 | 1/1988 | Alexander et al. . |
| 4,720,134 | 1/1988 | Seifert . |
| 4,929,015 | 5/1990 | Bauer . |
| 5,000,507 | 3/1991 | Baxter . |
| 5,009,463 | 4/1991 | Saitoh et al. . |
| 5,026,109 | 6/1991 | Merlot, Jr. . |
| 5,139,307 | 8/1992 | Koops et al. . |
| 5,427,429 | 6/1995 | Piontek et al. . |
| 5,511,844 | 4/1996 | Boardman . |
| 5,540,476 | 7/1996 | Cowsert . |
| 5,560,670 | 10/1996 | Boardman . |
| 5,829,820 | 11/1998 | Cowsert . |
| 6,015,184 | * 1/2000 | Ewing et al. ........................ 296/219 |

FOREIGN PATENT DOCUMENTS 1057247   2/1967   (GB) .

OTHER PUBLICATIONS

Encyclopedia of Polymer Science and Engineering, vol. 7, Fillers, pp. 53, 68–69, 1987.

ASC Incorporated Drawing No. W–39X0–4960–AXXX entitled "1990 Chrysler P-27 Convertible", Sheet 4F, (believed to have been offered for sale or publicly used prior to Aug. 26, 1999).

ASC Incorporated Drawing No. W–63X0–4960–AXXX entitled "1990 Saab Convertible", Sheet 5, (believed to have been offered for sale or publicly used prior to Aug. 26, 1999).

1973 Car Shop Manual, vol. IV, "Part 46–04 Mustang and Cougar Convertible Top" pp. 46–04–01 through 46–04–05.

1971 Fisher Body Service Manual, "Folding Top", pp. 12–1 through 12–24.

* cited by examiner

*Primary Examiner*—S. Thomas Hughes
*Assistant Examiner*—Jermie E. Cozart
(74) *Attorney, Agent, or Firm*—Harness, Dickey & Pierce, P.L.C.

(57) ABSTRACT

A composite roof bow includes a flexible plastic segment and a rigid reinforcing segment. In another aspect of the present invention, the flexible plastic segment is insert molded to the reinforcing segment. In another aspect of the present invention, the flexible segment is predominately unfilled plastic and the reinforcing segment is filled plastic, which are attached together to create a generally rigid roof bow.

35 Claims, 4 Drawing Sheets

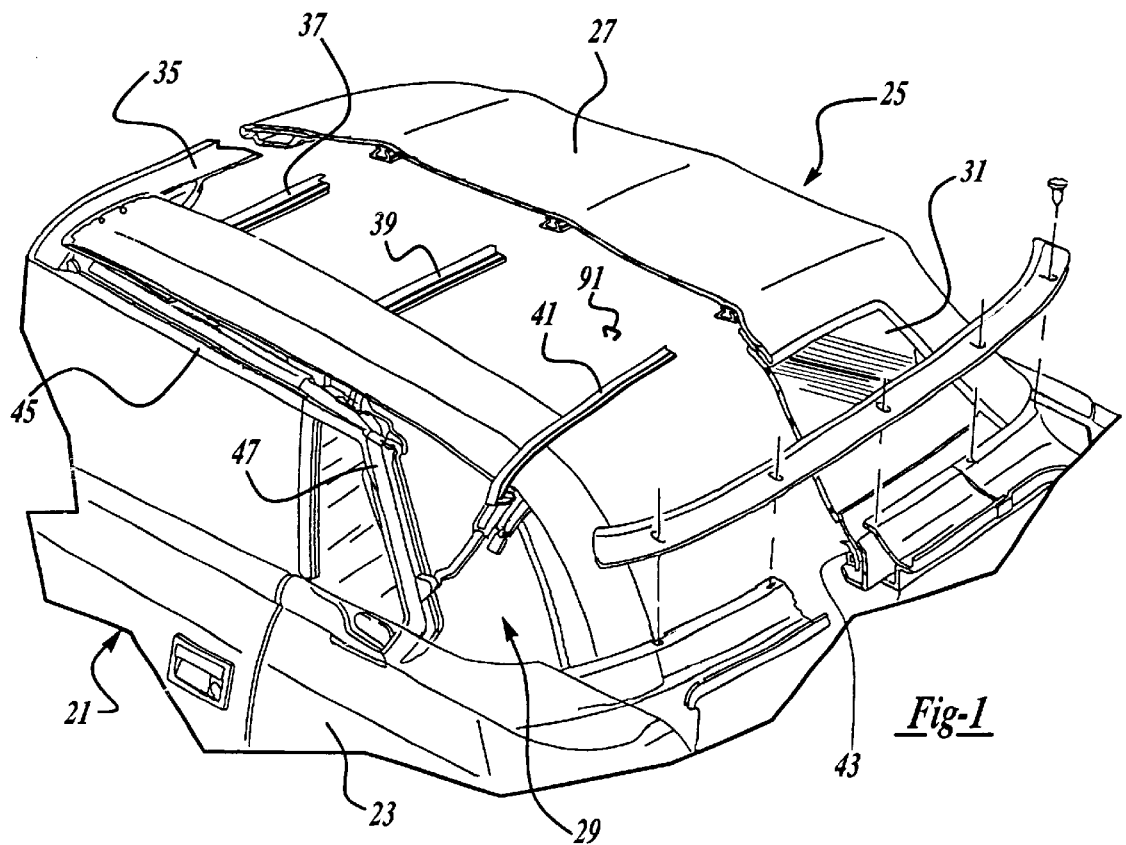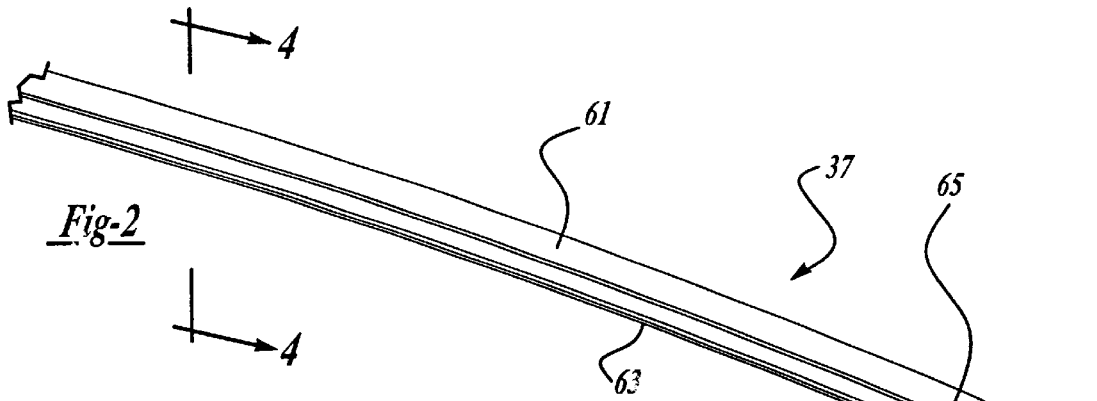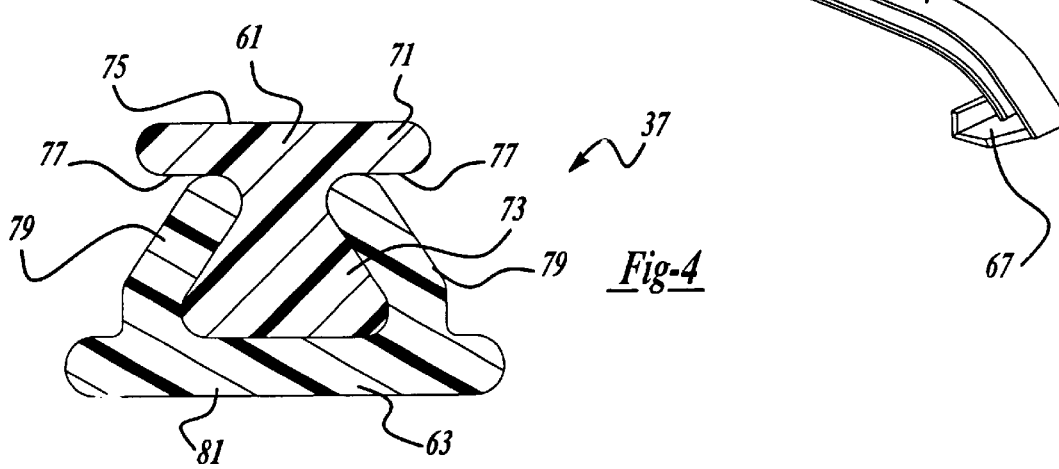

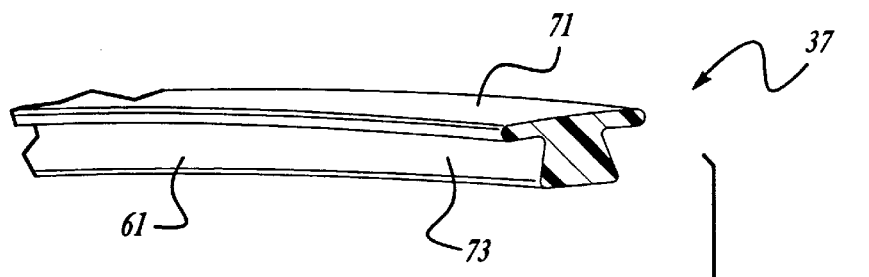
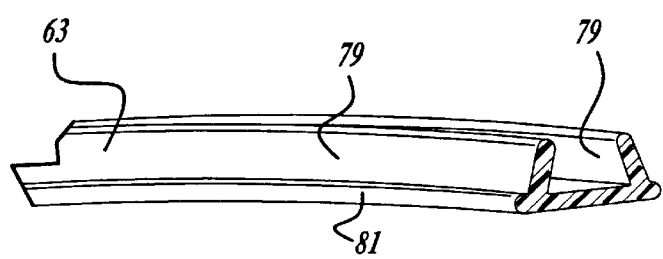
*Fig-3*
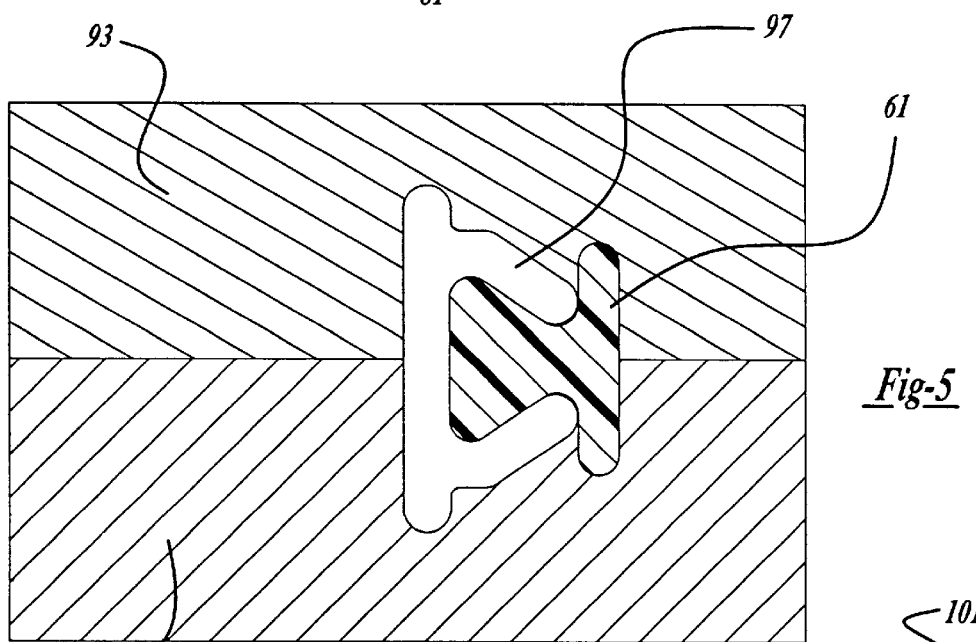
*Fig-5*
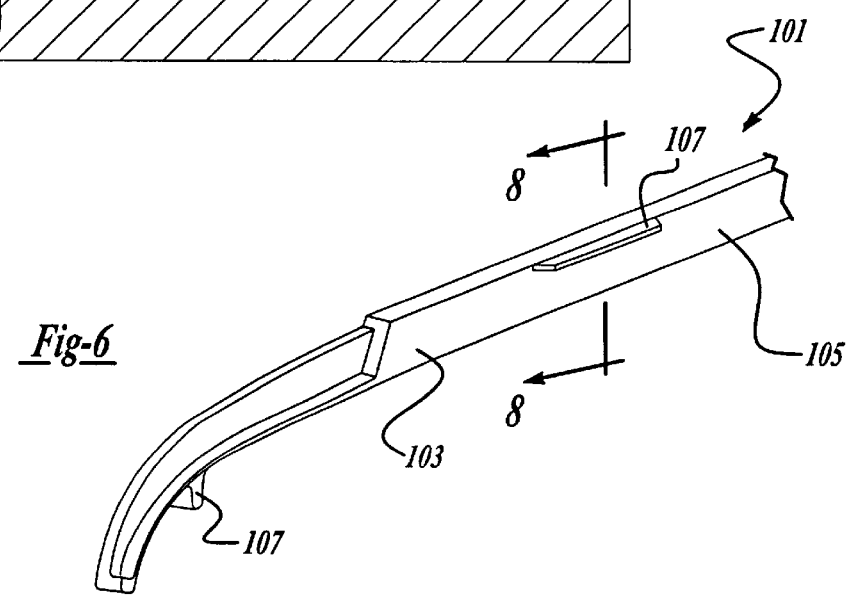
*Fig-6*

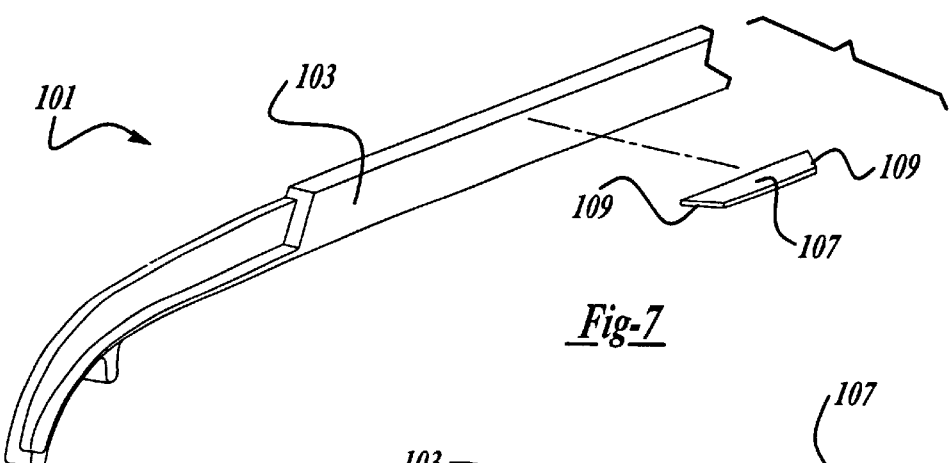
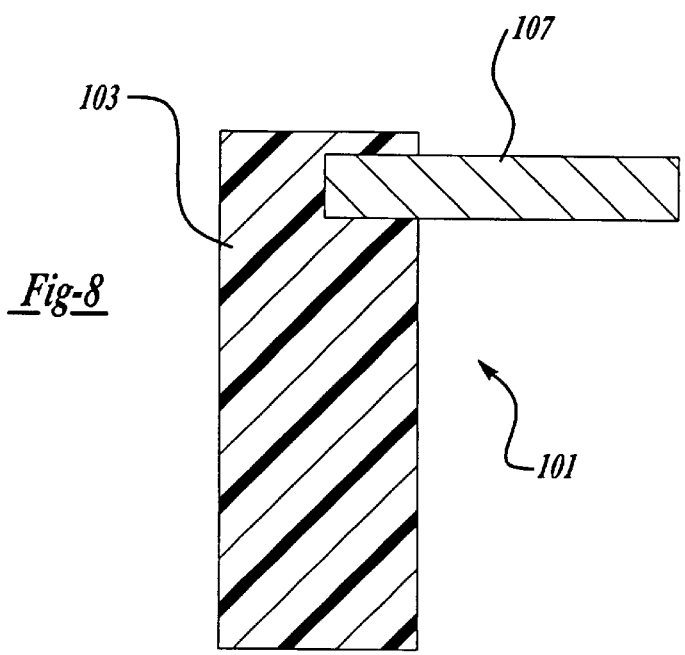
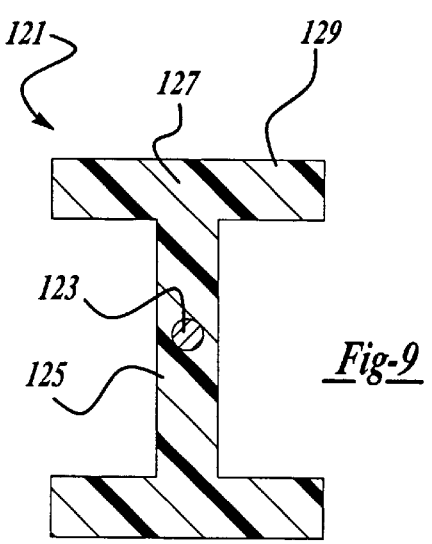
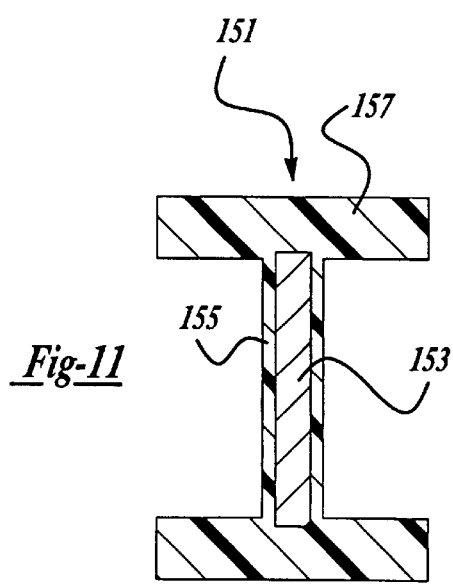
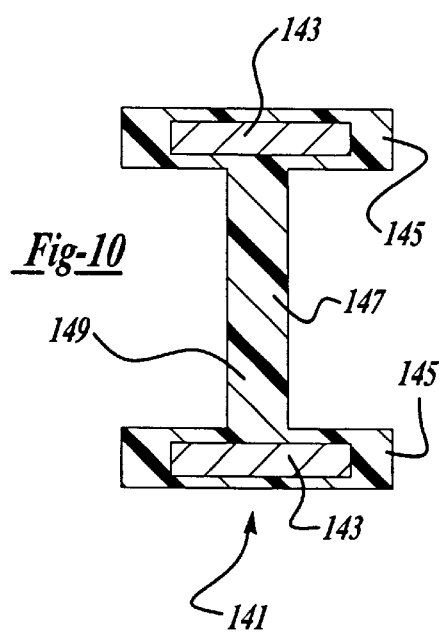

METHOD OF MAKING AN AUTOMOTIVE VEHICLE CONVERTIBLE ROOF

BACKGROUND AND SUMMARY OF THE INVENTION

This invention relates generally to roof bows and more particularly to a composite roof bow used with an automotive vehicle convertible roof.

It is well known to employ a plurality of roof bows for suspending a soft top convertible roof above a passenger compartment of an automotive vehicle. The roof bows are secured to the top by way of staple-like fasteners or placement of each bow within a pocket sewn to the lower side of the convertible roof. The soft top roof is commonly secured to the number one or forwardmost roof bow by being sandwiched between the number one bow and a trim panel. The roof bows are usually metal and extend in a cross-car manner between metal side rails which are oriented in a generally fore and aft manner. For example, a roof bow and side rail top stack mechanism are disclosed in U.S. Pat. No. 4,720,133 entitled "Convertible Top Structure" which issued to Alexander et al. on Jan. 19, 1988, the disclosure of which is incorporated by reference herein. Such traditional convertible roofs are movable from a raised and operable position covering the passenger compartment, to a stowed and retracted position in a bootwell between the passenger compartment and vehicle trunk.

Some conventional roof bow constructions have also attempted to combine metal with other assembled materials. For example, reference should be made to the following U.S. Pat. No. : 5,560,670 entitled "Top Bow Tack Strip" which issued to Boardman on Oct. 1, 1996; U.S. Pat. No. 2,580,337 entitled "Folding Top Structure" which issued to Votypka on Dec. 25, 1951; U.S. Pat. No. 2,538,931 entitled "Bow and Tacking Strip Assembly" which issued to Zummach on Jan. 23, 1951; U.S. Pat. No. 1,789,137 entitled "Reinforced [sic] Wooden Bow and method of Manufacture Thereof" which issued to Fitch on Jan. 13, 1931; and U.S. Pat. No. 366,511 entitled "Carriage Bow" which issued to Sampsell on Jul. 12, 1887. The wood roof bows are heavy, expensive to shape and are not dimensionally stable in wet weather. Moreover, for the versions employing unfilled plastic, the plastic bows appear to be relatively flexible and offer little freestanding structural support over the great distances spanned, especially when it is considered that the vehicle is often moving at high speeds on rough roads.

U.S. Pat. No. 5,427,429 entitled "Convertible Top Bow" which issued to Piontek et al. on Jun. 27, 1995, discloses a glass reinforced polymeric roof bow. Metal linkage hardware can be molded in place at the ends of the polymeric bow. While this patent is a significant improvement in the industry, it is desirable to further improve the characteristics of a rigid plastic roof bow by providing an additional metal insert in an area of the bow between the roof rail engaging ends.

In accordance with the present invention, a preferred embodiment of a composite roof bow includes a flexible plastic segment and a rigid reinforcing segment. In another aspect of the present invention, the flexible plastic segment is insert molded to the reinforcing segment. In another aspect of the present invention, the flexible segment is predominately unfilled plastic and the reinforcing segment is filled plastic, which are attached together to create a generally rigid roof bow. Still a further aspect of the present invention provides a metal reinforcing segment entirely disposed inside the plastic segment and the plastic segment has a generally I-cross sectional shape. In yet another aspect of the present invention, a reinforcement extends at least a majority of the cross-car length of the plastic bow. A method of making an automotive vehicle roof bow is also provided.

The composite roof bow of the present invention is advantageous over traditional bows in that the present invention advantageously uses the relatively lightweight and rigid property of a filled plastic while also minimizing brittle fracture of the plastic by employing either an unfilled plastic or a metallic reinforcement. The present invention is also advantageous by employing a low piece cost and fast method of manufacturing the composite bow with a minimal amount of manual assembly. The present invention achieves predictable tolerances regardless of environmental humidity while also employing relatively few parts to assemble the bow to a soft top convertible roof. Additional advantages and features of the present invention will become apparent from the following description and appended claims, taken in conjunction with the accompanying drawings.

BRIEF DESCRIPTION OF THE DRAWINGS

FIG. 1 is a partially exploded and sectioned perspective view showing a convertible roof employing the preferred embodiment composite roof bow of the present invention;

FIG. 2 is a fragmented perspective view showing the preferred embodiment composite roof bow;

FIG. 3 is a fragmented and exploded perspective view showing the preferred embodiment composite roof bow;

FIG. 4 is a cross sectional view, taken along line 4—4 of FIG. 2, showing the preferred embodiment composite roof bow;

FIG. 5 is a diagrammatic cross-sectional view showing an injection molding tool used to make the preferred embodiment composite roof bow of FIG. 4;

FIG. 6 is a fragmented perspective view showing a first alternate embodiment composite roof bow of the present invention;

FIG. 7 is a fragmented and exploded perspective view showing the first alternate embodiment composite roof bow;

FIG. 8 is a cross sectional view, taken along line 8—8 of FIG. 6, showing the first alternate embodiment composite roof bow;

FIG. 9 is a cross sectional view, similar to that of FIG. 4, showing a second alternate embodiment composite roof bow of the present invention;

FIG. 10 is a cross sectional view, similar to that of FIG. 4, showing a third alternate embodiment composite roof bow of the present invention.

FIG. 11 is a cross sectional view, similar to that of FIG. 4, showing a fourth alternate embodiment composite roof bow of the present invention.

DETAILED DESCRIPTION OF THE PREFERRED EMBODIMENT

Figure 12:
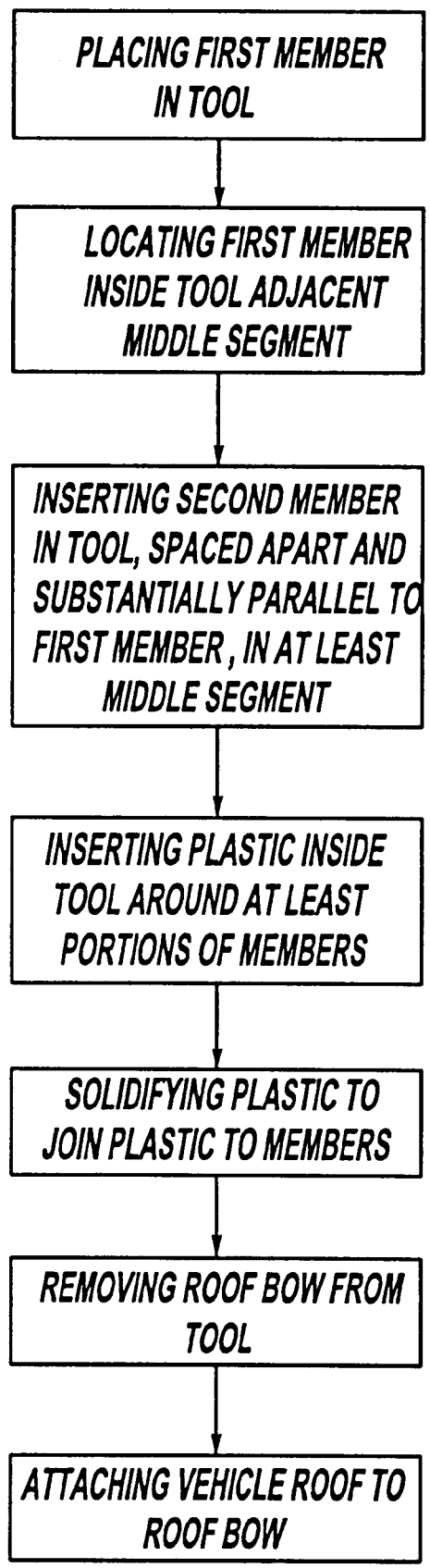
FIG. 12 is a diagram showing the method of making and assembling the first and third alternate embodiment composite roof bows of the present invention.

FIG. 1 illustrates an automotive vehicle 21 having a body 23 and a convertible roof 25. Convertible roof 25 is preferably of a soft top variety including a fabric roof 27, a top stack mechanism 29 and a back window or backlite 31. Top stack mechanism 29 employs a number one roof bow 35, a number two roof bow 37, a number three roof bow 39, a number four roof bow 41 and a number five roof bow 43.

Roof bows 35–43 are coupled either directly or indirectly to generally fore-and-aft oriented side rails 45 or rear rail 47 on each side of vehicle 21. Thus, the roof bows extend in a curved and generally horizontally oriented crosscar manner between the sets of rails when convertible roof 25 is disposed in its raised and operable position, as shown. When stowed or retracted, convertible roof 25 is lowered into a bootwell or other storage compartment in body 23.

The preferred embodiment roof bow of the present invention is a two-part composite bow, such as exemplary number two bow 37. However, it must be appreciated that any of the convertible top roof bows can be of the presently disclosed composite construction. Referring to FIGS. 2–4, the preferred embodiment composite roof bow 37 has an unreinforced plastic member 61 and a reinforced plastic member 63 extending throughout a middle segment 65 which is defined as the crosscar portion located between rail fastening ends 67. Unreinforced plastic member 61 is preferably extruded from structurally unfilled nylon 6/6 while reinforced plastic member 63 is preferably injection molded from a 35–50% chopped glass fiber filled nylon 6/6.

Unreinforced plastic member 61 has a modified generally I cross sectional shape defined by an externally visible head 71 and a triangularly enlarged base 73. Head 71 has a flat exterior surface 75 and opposed flat surfaces 77. A pair of inwardly angled arms 79 of reinforced plastic member 63 securely grasp and at least partially encapsulate triangular base 73 therein. Arms 79 of reinforced plastic member 63 depend from the same face of a flat wall 81 (when viewed in cross section like FIG. 4). Rail fastening ends 67 are formed as part of reinforced plastic member 63 and may have a pivot hole or other rail attachment characteristics. Except for ends 67, members 61 and 63 run in a parallel manner and have a generally uniform cross section.

An important characteristic of composite roof bow 37 is that reinforced plastic 63 provides significant tensile and compressive strength while also exhibiting dimensional stability in all environmental conditions. Furthermore, reinforced plastic member 63 is relatively lightweight thereby minimizing top stack actuation forces while enhancing vehicle fuel economy and engine performance. However, reinforced plastic member 63 is somewhat brittle. Therefore, unreinforced plastic member 61 reduces the overall brittleness of composite bow 37 since unreinforced plastic member 61 is a relatively resilient, flexible and fracture resistant component. More specifically, the resilient nature of unreinforced and structurally unfilled (pigment and regrind filling not being considered structural) material reduces brittleness and undesired failure of the composite bow while benefiting from the structural strength of reinforced plastic member 63. Thus, both members 61 and 63 act together to synergistically enhance the overall composite bow characteristics by overcoming any inherent shortcomings of the other materials. Furthermore, head 71 of unreinforced plastic member 61 acts as a tack strip for receiving mechanical fasteners such as staples 91 (see FIG. 1) inserted therein in order to secure top 27 to roof bow 37.

FIG. 5 illustrates an injection molding tool or mold having an upper movable die 93 and a lower die 95 operably associated with an injection molding machine (not shown). First, unreinforced plastic member 61 is extruded in an extrusion die associated with a plastic extrusion machine (not shown). The extrusion machine and extrusion die serve to provide a slight curve to unreinforced plastic member 61 and then member 61 is cut to the desired length. Second, unreinforced plastic member 61 is manually or robotically placed in lower die 95.

Third, lower die 95 is shuttled into a usable position adjacent the injection molding nozzle. Upper die 93 is then closed against lower die 95 and the corresponding section of unreinforced plastic member 61. Thus, unreinforced plastic member 61 is temporarily secured inside the tool while also defining part of the mold cavity 97 which creates the exterior shape of what will become reinforced plastic member 63 (see FIG. 3).

Fourth, the injection molding machine pushes and expels the molten glass filled plastic from the barrel, through the gate of the tool, through a runner system in the tool, and into cavity 97 of the tool. This causes the glass filled plastic to securely and permanently (without destruction) engage and at least partially encapsulate the base of unreinforced plastic member 61 in dies 93 and 95. The reinforced plastic is allowed to cool, thereby solidifying and rigidifying within the tool. Fifth, upper die 93 is opened, lower die 95 is shuttled away from the injection molding machine and the joined members 61 and 63 are removed from the tool, thereby creating a composite roof bow. A non-shuttling, horizontally closing set of dies can also be used. It is alternately envisioned that one of the plastic members could be made of extruded or cast metal, such as aluminum, while the other of the plastic members is glass or otherwise structurally filled, but still using the same process as described with the preferred embodiment.

A first alternate embodiment is shown in FIGS. 6–8. This first alternate embodiment composite roof bow 101 employs a glass filled plastic member 103 having a middle segment 105 spanning between rail fastening ends 107. Reinforced plastic member 103 has a uniform and generally rectangular cross sectional shape throughout middle segment 105. Two or more crosscar-elongated metallic members 107 are locally insert molded partially within reinforced plastic member 103 at load intensive locations. These unreinforced or metal insert members 107 are spaced apart from each other, have a generally horizontal orientation (when in the raised position) and have a generally rectangular cross section. The leading and trailing edges 109 of each insert member 107 are tapered. Insert members 107 are stamped aluminum or steel which are partially encapsulated during the injection molding process. It is alternately envisioned that rectangular insert member 107 can continuously extend as a single elongated piece from middle segment 105 of reinforced plastic member 103. Thus, insert member 107 provides ductility, resilience and fracture resistance while reinforced plastic member 103 is lightweight and structurally strong.

A second alternate embodiment of the present invention composite roof bow 121 is illustrated in FIG. 9. In this embodiment, a circular cross-sectionally shaped metal member 123, such as a rod or wire, is insert molded within a web 125 of an I cross sectionally shaped glass filled plastic member 127. Web 125 spans in a perpendicular manner between a pair of parallel and opposed walls 129 thereby defining an I beam shape. Unreinforced metal member 123 continuously extends along the entire middle segment of composite bow 121.

A third alternate embodiment is shown in FIG. 10. This composite roof bow 141 employs a pair of spaced apart, parallel and continuous unreinforced or metal members 143 insert molded and entirely encapsulated within parallel walls 145 joined together by a web 147. Walls 145 and web 147 are made of a glass reinforced plastic member 149 having a generally I cross sectional shape. Unreinforced insert members 143 are preferably extruded or stamped metal such as aluminum or steel but may alternately be unfilled (in other words, generally absent of a structural filler) plastic.

The method of making and assembling the first and third alternate embodiment composite roof bows is shown in FIG. 12.

Finally, referring to FIG. 11, a fourth alternate embodiment composite roof bow 151 employs a continuous unreinforced or metal member 153 insert molded within a web 155 of a glass fiber reinforced plastic member 157. Alternately, unreinforced member 153 may consist of multiple spaced apart insert members which are entirely encapsulated or predominantly encapsulated within the injection molded plastic. Plastic member 157 can also be extruded with metal member 153 therein. Various pins or other positioning members may be needed within the injection molding tool to properly locate the unreinforced insert member during injection molding of the reinforced plastic member. It is also envisioned that many of the internal and external corners shown may alternately be slightly rounded to ease flow of the plastic during molding and increase strength of the composite roof bow.

While various embodiments of the composite roof bow have been disclosed herein, other variations may be employed within the spirit of the present invention. For example, other shapes and locations of the reinforced and unreinforced component parts may be provided. Moreover, additional linkages may be needed to couple the roof bow ends to the rails or other top stack components. The composite roof bow of the present invention may also be used with a rigid hard-top roof. While various materials have been disclosed, other materials may alternately be employed as long as the disclosed function is achieved. It is intended by the following claims to cover these and any other departures from the disclosed embodiments which fall within the true spirit of this invention.

The invention claimed is:

1. A method of making a composite roof bow in a tool and assembling the roof bow to a vehicle roof, the bow having end segments and a middle segment spanning between the end segments, the bow including a first plastic and an elongated member, the method comprising:
   (a) placing the member in the tool;
   (b) locating the member inside the tool adjacent where the middle segment of the first plastic will be formed;
   (c) inserting the first plastic into the tool in a molten state, around at least a portion of the member;
   (d) solidifying the first plastic for joining the member to the first plastic;
   (e) removing the joined first plastic and the member from the tool; and
   (f) attaching the vehicle roof to the composite roof bow.

2. The method of claim 1 further comprising making the member from metal and making the first plastic from an engineering grade plastic.

3. The method of claim 2 wherein the first plastic includes a fiber filling.

4. The method of claim 1 further comprising making the member from plastic.

5. The method of claim 4 further comprising making the member from unreinforced plastic.

6. The method of claim 1 further comprising injecting the first plastic in a molten state into the tool which is an injection mold.

7. The method of claim 1 further comprising extruding the member.

8. The method of claim 1 further comprising substantially preventing an elongated surface of the member from being completely covered by the first plastic adjacent the middle segment of the roof bow.

9. The method of claim 1 further comprising fully encapsulating the member inside the first plastic.

10. The method of claim 1 further comprising creating plastic pivot interfaces adjacent the end segments of the roof bow.

11. The method of claim 1 further comprising forming the middle segment in a substantially I cross sectional shape.

12. The method of claim 1 wherein the member is created to have a circular cross sectional shape.

13. A method of making a composite roof bow in a tool and assembling the roof bow to a vehicle roof, the bow having end segments and a middle segment spanning between the end segments, the bow including a first plastic and an elongated first metal member, the method comprising:
   (a) placing the first metal member in the tool;
   (b) locating the first metal member inside the tool adjacent where the middle segment of the first plastic will be formed;
   (c) inserting a second member made of metal in the tool prior to inserting the first plastic into the tool;
   (d) inserting the first plastic into the tool around at least a portion of the first metal member;
   (e) solidifying the first plastic for joining the first member to the first plastic and attaching the metal members to the first plastic in the tool after spacing the metal members from each other in a substantially parallel orientation in at least the middle segment of the roof bow;
   (f) removing the joined first plastic and the members from the tool; and
   (g) attaching the vehicle roof to the composite roof bow.

14. The method of claim 13 further comprising making the first plastic from an engineering grade plastic.

15. The method of claim 14 wherein the first plastic includes a fiber filling.

16. The method of claim 13 further comprising injecting the first plastic in a molten state into the tool which is an injection mold.

17. The method of claim 13 further comprising extruding at least one of the metal members.

18. The method of claim 13 further comprising fully encapsulating at least one of the metal members inside the first plastic.

19. The method of claim 13 further comprising forming the middle segment in a substantially I cross sectional shape.

20. The method of claim 13 further comprising longitudinally spacing the metal members apart from each other in a cross-car direction.

21. The method of claim 13 further comprising vertically spacing the metal members apart from each other such that at least portions of the metal members overlap each other.

22. A method of making an automotive vehicle convertible roof bow in a tool, the method comprising:
   (a) placing a first elongated metal member in the tool;
   (b) injecting liquid plastic into the tool;
   (c) joining the first metal member to the plastic in a substantially permanent manner; and
   (d) inserting a second metal member in the tool and joining the second metal member to the plastic in a substantially permanent manner;
      wherein at least a majority of the metal first member extends in a substantially cross-car and horizontal direction when installed in the vehicle.

23. The method of claim 22 wherein at least the first metal member reduces fracture of the adjacent portion of the roof bow.

24. The method of claim 23 wherein the plastic resists bending.

25. The method of claim 22 wherein the plastic includes a fiber filling.

26. The method of claim 22 further comprising injecting the plastic in a molten state into the tool which is an injection mold.

27. The method of claim 22 further comprising extruding the first member.

28. The method of claim 22 further comprising fully encapsulating the first member inside the plastic.

29. The method of claim 22 further comprising creating plastic pivot interfaces adjacent the end segments of the roof bow.

30. The method of claim 22 further comprising forming a middle segment of the roof bow in a substantially I cross sectional shape.

31. The method of claim 22 wherein the first member is created to have a circular cross sectional shape.

32. The roof bow of claim 22 wherein at least a majority of the first member is located inside the plastic.

33. The roof bow of claim 22 wherein the first member has a rectangular cross sectional shape.

34. The roof bow of claim 22 further comprising forming the plastic into a curved shape by the tool, wherein the first member is continuously secured to the formed plastic along a majority of an elongated length of the formed plastic.

35. The roof assembly of claim 22 further comprising securing the roof to the roof bow with mechanical fasteners by inserting the fasteners into the formed plastic.

* * * * *

UNITED STATES PATENT AND TRADEMARK OFFICE
CERTIFICATE OF CORRECTION

PATENT NO. : 6,282,791 B1
DATED : September 4, 2001
INVENTOR(S) : Jeffrey S. Patelczyk Page 1 of 1

It is certified that error appears in the above-identified patent and that said Letters Patent is hereby corrected as shown below:

Column 2,
Line 51, delete "and".
Lines 52-54, delete "FIG. 12 is a diagram showing the method of making and assembling the first and third alternate embodiment composite roof bows of the present invention".
Line 57, delete "." and insert therefor -- ; and Figure 12 is a diagram showing the method of making and assembling the first and third alternate embodiment composite roof bows of the present invention --.

Signed and Sealed this

Thirtieth Day of April, 2002

Attest:

Attesting Officer

JAMES E. ROGAN
Director of the United States Patent and Trademark Office